Aug. 9, 1949.    S. J. PASK ET AL    2,478,309
GRAVITY OPERATED PIVOTED SHUTTER
AND COVER BLIND FOR CAMERAS
Filed May 8, 1946    2 Sheets-Sheet 1
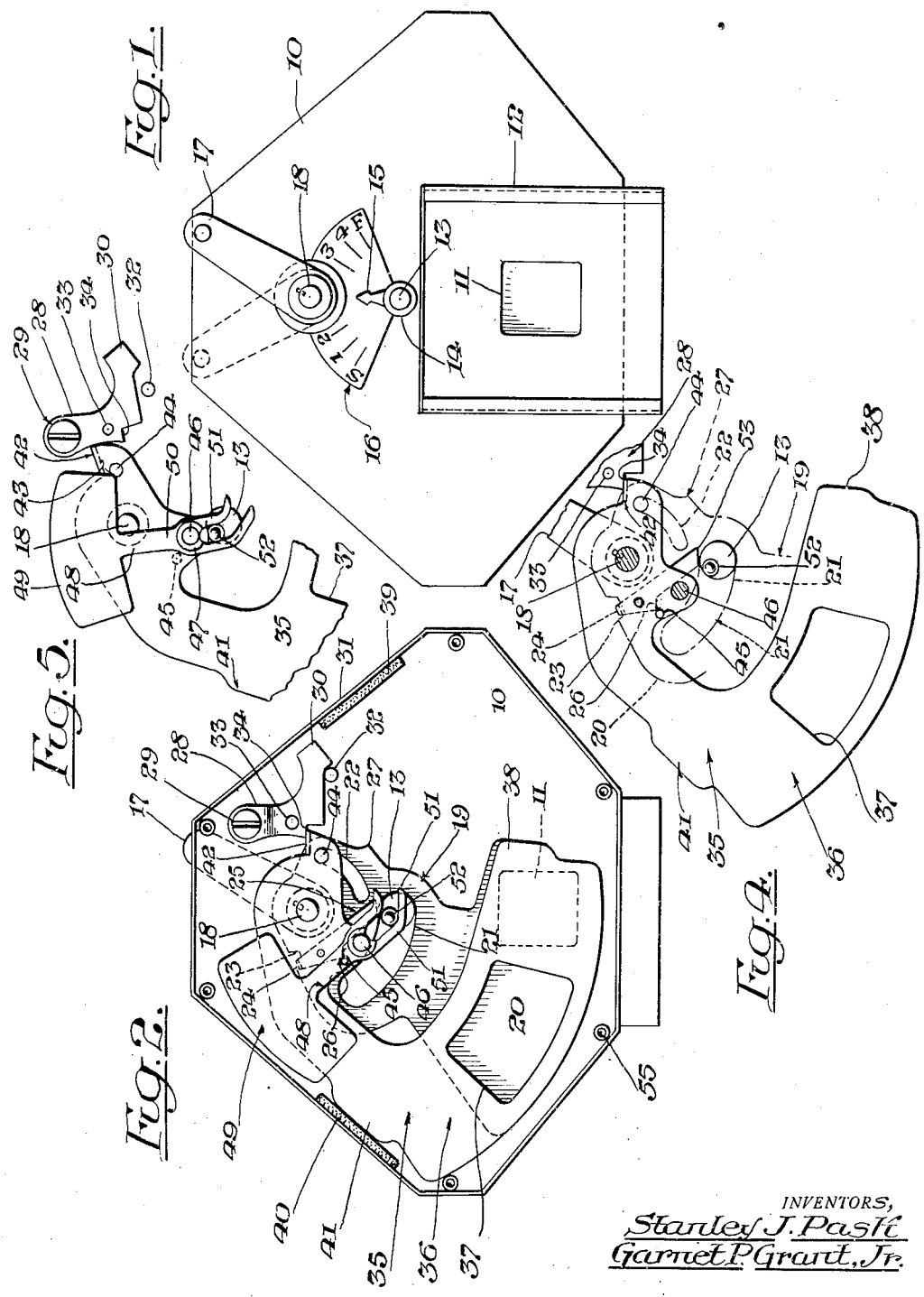
INVENTORS,
Stanley J. Pask
Garnet P. Grant, Jr.
BY Cousins & Cousins
ATTORNEYS,

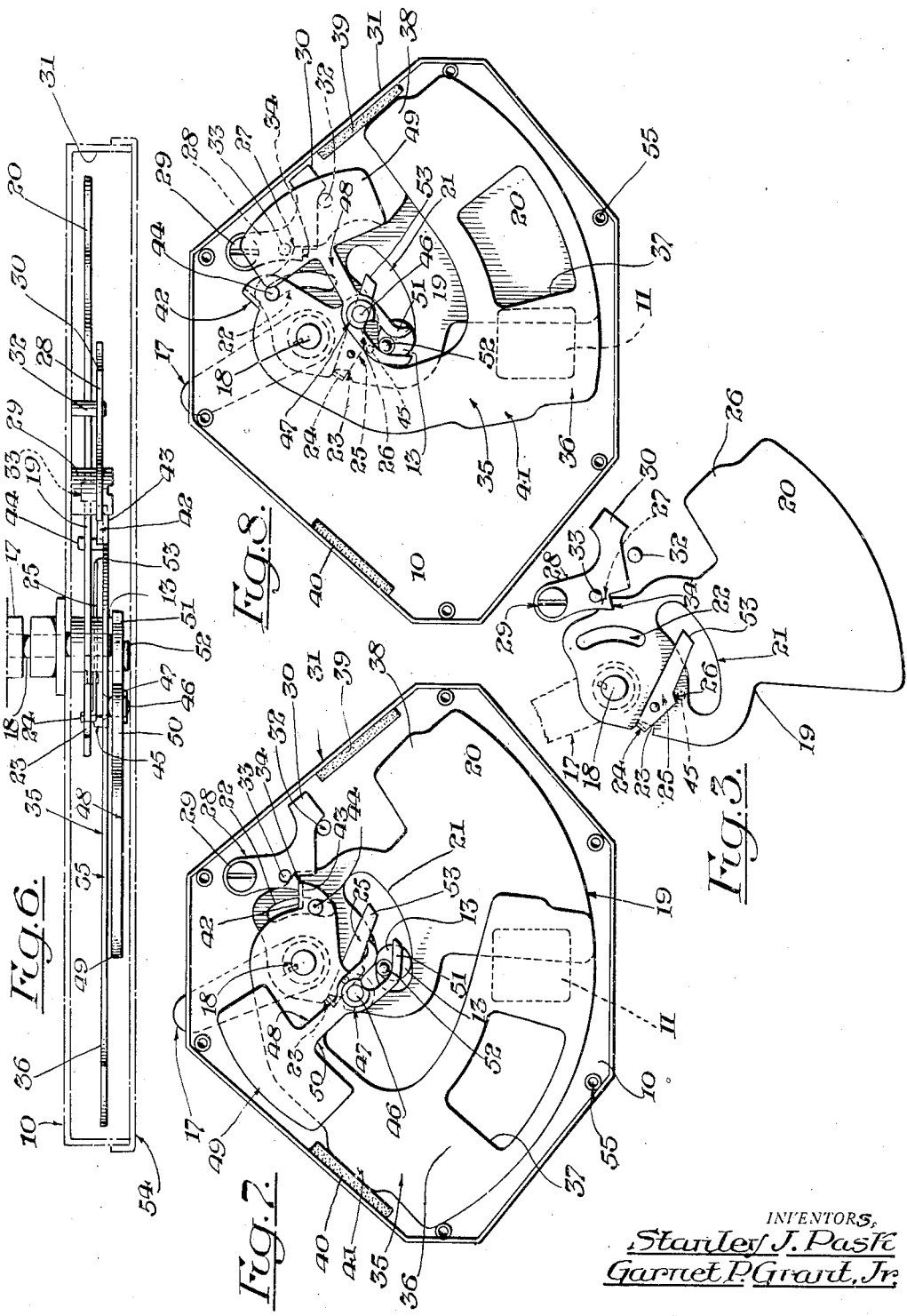

Patented Aug. 9, 1949

2,478,309

UNITED STATES PATENT OFFICE 2,478,309

GRAVITY OPERATED PIVOTED SHUTTER AND COVER BLIND FOR CAMERAS

Stanley J. Pask, Long Island City, N. Y., and Garnet P. Grant, Jr., Riverside, Conn., assignors to Grant Photo Products, Inc., New York, N. Y., a corporation of Delaware Application May 8, 1946, Serial No. 668,077

6 Claims. (Cl. 95—60)

This invention relates to photographic shutters such as are used in cameras having a fixed position.

In commercial photography where a plurality of exposures are taken on a continuous strip of sensitized film, often by unskilled operators, failure of the camera shutter is common and highly undesirable. Such failure is often due to shutter wear, broken spring mechanisms or clock escapements.

An object of this invention is to provide a shutter which will operate on the swinging pendulum principle and thereby eliminate the common causes of shutter failure.

Another object of this invention is to provide a shutter which may be applied in front of the camera lens so that it may be replaced without disturbing the camera's critical lens focus.

A final object of this invention is to provide a pendulum type shutter which shall have a plurality of shutter speeds which will not vary with prolonged use.

The invention consists of the construction, combination and arrangement of parts, as herein illustrated, described and claimed.

In the accompanying drawings forming part hereof is illustrated one form of embodiment of the invention, in which drawings similar reference characters designate corresponding parts, and in which:

Figure 1 is a front elevation of the pendulum shutter.

Figure 2 is an elevation taken from the rear of the shutter with the cover plate removed.

Figure 3 is an elevation of one of the shutter leaves.

Figure 4 is an elevation of the second shutter leaf.

Figure 5 is a fragmentary view of the shutter timing mechanism.

Figure 6 is a plan view of the assembled shutter.

Figure 7 is a rear elevation of the shutter, showing the leaves in the primed position.

Figure 8 is a rear elevation of the shutter, showing the position of the leaves immediately after an exposure.

Referring to the drawings, and particularly to Figure 1, 10 indicates a mounting plate having an opening 11 therein whereby light is admitted to the camera lens when the shutter is tripped. A lens shade 12 is secured to the plate 10 around the opening 11. A small shaft 13 is located above the lens shade 12 and is provided with a suitable knob 14 for rotating it. A pointer 15 is attached to the knob 14 so that the amount of shaft 13 rotation may be read upon a series of graduations 16 inscribed upon the mounting plate 10 above the shaft 13. Said shaft 13 passes through the plate 10 and co-operates with a hereinafter described mechanism. A trip lever 17 secured to a shaft 18 completes the features shown on the front of the mounting plate 10 in Figure 1.

A rear view of the mounting plate 10 and the shutter mechanism attached to it can be seen in Figure 2. The shutter mechanism consists primarily of two leaves which move past the opening 11 in the plate 10. The inner or priming leaf 19 follows a path of travel adjacent to and parallel with the back of the mounting plate 10. Said leaf 19 is keyed to the shaft 18 of the trip lever 17 so as to be directly actuated by it. The blade 20 of the inner leaf consists of an unbroken plane surface so that no light may enter the camera through the opening 11 in the plate 10 until the leaf 19 is swung out of the way. A more detailed view of the construction of the inner or priming leaf 19 is shown in Figure 3 from which it can be seen that two arcuate slots are provided in the upper portion of the leaf 19. The lower slot 21 has an axis which runs parallel to the path of travel of the leaf 19. The upper arcuate slot 22 has an axis which runs parallel with the arc described by the right hand portion of the trip lever shaft 18. The leaf 19 has a notch 23 cut in the upper portion of its left hand edge. Said notch 23 receives the inwardly turned edge 24 of a dog 25 pivoted upon the face of the priming leaf 19. The dog 25 has a tooth 26 in its edge for a hereinafter described purpose.

The lower edge of the leaf 19 is arc shaped so that it swings clear of the bottom of the mounting plate. The right hand edge of the blade 20 is extended to form a stop 26 to check the upward motion of the leaf to the right. A small detent 27 is provided on the upper right hand edge of the priming leaf 19 to trip a pawl 28, shown in Figures 2–8.

The pawl 28 swings freely upon a screw 29 passed through the upper part thereof. Said screw 29 is secured to the back of the mounting plate 10 and maintains the pawl 28 in a position spaced from the surface of the plate 10.

A stop member 30 is formed, integral with the pawl 28, so that the distance which the pawl may swing to the right is limited by the distance between the stop member 30 and the rearwardly turned edge 31 of the mounting plate. Rotation of the pawl 28 to the left is prevented by a projecting pin 32 on the mounting plate 10 which supports the stop member 30 of the pawl until the detent 27 trips the said pawl 28. The detent 27 bears against a small lug 33 secured to the underside of the pawl 28 thereby forcing it to the right. This causes the pawl tooth 34 to release the second shutter leaf 35 which is primed and held by it, as hereinafter described.

The second or primed shutter leaf 35 overlies the first and is secured to the end of the trip shaft 18 in such manner as to swing freely thereon. This leaf 35 (shown in Figure 4) has a blade 36 which is pierced at 37 to expose the photographic plate as it swings past the opening 11 in the mounting plate 10. The right hand edge of the blade 36 is provided with a stop member 38, integral therewith, to limit the swing of the leaf 35 to the right. The stop member 38 contacts a resilient cushion 39, shown in Figures 7 and 8, which is secured to the rearwardly turned edge 31 of the mounting plate 10 and which yieldably prevents further swing of the leaf 35. A companion cushion 40 is attached to the opposite edge of the plate 10 to limit the travel of the leaf 35 toward the left. A stop member 41 is provided on the left hand edge of the leaf 35 to butt this cushion 40. The upper portion of the primed shutter leaf 35 terminates in a detent 42 having an inwardly turned flange 43 integral therewith to engage with the pawl tooth 34. This flange cooperates with the pawl 28 to prime the shutter leaf 35, as hereinafter described. An inwardly extending pin 44 is secured to the shutter leaf 35 at a point immediately below the detent 42. This pin extends into the arcuate slot 22 in the priming shutter leaf 19 thereby limiting the amount the two leaves 19, 35 can become separated.

An inwardly extending finger 45 is provided on the primed leaf 35 and is located below the bore therein for the trip shaft 18 and slightly to the left of a small outwardly projecting shaft 46. This finger 45 catches the tooth 26 of the dog 25 when the leaves assume the position shown in Figure 8 and serves to prevent the leaves from separating and thereby spoiling the negative after the exposure is made (see Figure 3).

The outwardly extending shaft 46 on the leaf 35 is provided with a collar 47 at the end thereof and serves as a pivot for a counterweight 48, shown in detail in Figure 5. The said counterweight is substantially T shaped, the cross member constituting the weight 49 and the upright serving as the pivotal structure. The ends of the upright member 50 of the counterweight 48 are bifurcated 51 and formed so as to engage the eccentric cam 52, formed on the end of the cam shaft 13, at all times. The said cam shaft 13 extends beyond the shutter leaves 19, 35 through the lower arcuate slot 21 in the inner leaf 19.

With the parts assembled as shown in plan in Figure 6 and in elevation in Figures 2, 7 and 8, the operation of the shutter becomes apparent.

Priming of the shutter is accomplished by moving the trip lever 17 to the position shown in Figure 2. This causes the inner or priming leaf 19 to move to the left. The upper arcuate slot 22 in the leaf 19 causes the outer or primed leaf 35 to move to the left also by reason of the pin 44 attached to the leaf 35 and extending into the slot 22. As the leaves 19, 35 reach the end of their swing to the left, the detent 42 on the outer leaf 35 becomes engaged by the tooth 34 of the pawl 28. The leaf dog 25 releases the finger 45 secured to the leaf 35. This action is the result of the extended end 53 of the dog 25 which causes it to rotate slightly as the dog 25 comes into contact with the shaft 13. The inner or priming leaf 19 is now free of the primed leaf 35 and swings downwardly under the force of gravity when the lever 17 is released. The opening 11 in the mounting plate 10 has remained covered throughout this operation since the coupled leaves 19, 35 present a lightproof shield. The shutter leaves are now in the position shown in Figure 7.

Further movement of the inner leaf 19 to the right of the position shown in Figure 7 by means of the lever 17, carries its blade 20 clear of the opening 11 and, by the operation of the trip lever 27, causes the pawl 28 to be forced to the right by the pawl lug 33. This releases the primed shutter leaf 35 which swings downwardly and to the right as a result of its pendulum-like construction. As the leaf 35 moves it causes the counterweight 49 to rotate to the right on its shaft 46. By the time the leaf 35 reaches the bottom of its swing, the counterweight 48 has passed the vertical position and operates as a lever through its bifurcated members 51 to urge the leaf 35 to complete its travel to the right until it is caught by the dog 25.

The length of the time interval during which the aperture 37 in the shutter leaf blade 36 passes across the opening 11 in the mounting plate 10 determines the amount of exposure. This interval is varied by the speed of travel of the counterweight 48, which in turn depends upon the position of the eccentric cam 52 located between the bifurcated ends 51 of the counterweight. Thus by turning the knob 14 on the front of the mounting plate 10 the shutter speed may be varied.

The entire shutter is enclosed by a cover plate 54, shown in dotted lines in Figure 6. Said plate is secured to the mounting plate 10 by screws which engage internally threaded sleeves 55 attached to the mounting plate 10. An opening (not shown) is provided in the cover plate 54 for the passage of light during film exposure. This opening is of the same size and shape as the mounting plate opening 11 and is in register with it.

Figure 8 illustrates the position of the shutter immediately after an exposure. It will be noticed that the extended left hand edge of the leaf blade 36 now covers the opening 11 in the mounting plate. The leaf dog 25 now locks with the finger 45 on the leaf 35 and, in co-operation with the arcuate slot 22 and the pin 44 in the leaf 35, holds the two leaves 19, 35 together. This prevents film exposure while the shutter leaves 19, 35 are swung back into the priming position shown in Figure 7.

The construction of the pendulum-type shutter makes it desirable to use it in a vertical position and rigidly mounted upon a fixed support. It is possible, however, by the use of obvious mechanical expedients, to make it operable in other positions as desired.

Having thus fully described the invention, what is claimed as new and desired to be secured by Letters Patent of the United States, is:

1. In a camera shutter, an apertured shutter plate, a shaft supported by the shutter plate and normal thereto, a first shutter leaf carried by the shaft in the said shutter plate, a second shutter leaf comprising spaced aperture covering portions and an exposure opening therebetween, said second shutter leaf being freely mounted upon the shaft in said shutter plate and engageable with the first leaf after an exposure to maintain the leaves in aperture closing relationship with said opening being covered by the first leaf, a pawl rotatably supported by the shutter plate, said pawl being adapted to grasp the second leaf, means carried by the first leaf to raise the second leaf above its position of gravitational rest into an aperture closing relationship with respect to the opening in the shutter plate and into engagement with the said pawl, means to remove the first leaf from aperture closing position, and means to trip the pawl to release the said leaf to admit light into the camera and thereafter close the said shutter plate aperture.

2. In a camera shutter, an apertured shutter plate, a first shutter leaf carried by the said shutter plate, a second shutter leaf comprising spaced aperture covering portions and an exposure opening therebetween, said second shutter leaf being freely mounted upon the shutter plate and engageable with the first leaf after an exposure to maintain the leaves in aperture closing relationship with said opening being covered by the first leaf, a counter-weight pivotally mounted upon the second leaf to govern the speed thereof, a pawl rotatably supported by the shutter plate, said pawl being adapted to grasp the second leaf, means carried by the first leaf to raise the second leaf above its position of gravitational rest into an aperture closing relationship with respect to the opening in the shutter plate and into engagement with said pawl, means to remove the first leaf from aperture closing position, and means to trip the pawl to release the second leaf to admit light into the camera and thereafter close the said shutter plate aperture.

3. In a camera shutter, an apertured shutter plate, a shaft supported by the shutter plate and normal thereto, an eccentric cam supported by the shutter plate, a first shutter leaf carried by the shaft in the said shutter plate, a second shutter leaf comprising spaced aperture covering portions and an exposure opening therebetween, said second shutter leaf being freely mounted upon the shaft in said shutter plate and engageable with the first leaf after an exposure to maintain the leaves in aperture closing relationship with said opening being covered by the first leaf, a counter-weight pivotally mounted upon the second leaf coupled to the said eccentric to govern the speed of the said second leaf, a pawl rotatably supported by the shutter plate, said pawl being adapted to grasp the second leaf, means carried by the first leaf to raise the second leaf above its position of gravitational rest into an aperture closing relationship with respect to the opening in the shutter plate and into engagement with the said pawl, means to remove the first leaf from aperture closing position, and means to trip the pawl to release the second leaf to admit light into the camera and thereafter close the said shutter plate aperture.

4. In a camera shutter, an apertured shutter plate, a shaft supported by the shutter plate and normal thereto, a rotatable eccentric cam supported by the shutter plate, a first shutter leaf carried by the shaft in the said shutter plate, a second shutter leaf comprising spaced aperture covering portions and an exposure opening therebetween, said second shutter leaf being freely mounted upon the shaft in said shutter plate and engageable with the first leaf after an exposure to maintain the leaves in aperture closing relationship with said opening being covered by the first leaf, a counter-weight pivotally mounted upon the second leaf coupled to the said eccentric and responsive to the rotation thereof to govern the speed of the said second leaf, a pawl rotatably supported by the shutter plate, said pawl being adapted to grasp the second leaf, means carried by the first leaf to raise the second leaf above its position of gravitational rest into an aperture closing relationship with respect to the opening in the shutter plate and into engagement with the said pawl, means to remove the first leaf from aperture closing position, and means to trip the pawl to release the second leaf to admit light into the camera and thereafter close the said shutter plate aperture.

5. In a camera shutter, an apertured shutter plate, a first shutter leaf carried by the said shutter plate, a second shutter leaf comprising spaced aperture covering portions and an exposure opening therebetween, said second shutter leaf being freely mounted upon the shutter plate, a dog held by the first leaf, a pin carried by the second leaf and engageable with the said dog on the first leaf after an exposure to maintain the leaves in aperture closing relationship with said opening being covered by the first leaf, a pawl rotatably supported by the shutter plate, said pawl being adapted to grasp the second leaf, means carried by the first leaf to raise the second leaf above its position of gravitational rest into an aperture closing relationship with respect to the opening in the shutter plate and into engagement with the said pawl, means to remove the first leaf from aperture closing position, and means to trip the pawl to release the second leaf to admit light into the camera and thereafter close the said shutter plate aperture, and means to release the dog to permit the cycle to be repeated.

6. In a camera shutter, an apertured shutter plate, a shaft supported by the shutter plate and normal thereto, a rotatable eccentric cam supported by the shutter plate, a first shutter leaf carried by the shaft in the said shutter plate, a second shutter leaf comprising spaced aperture covering portions and an exposure opening therebetween, said second shutter leaf being freely mounted upon the shaft in the said shutter plate, a dog held by the first leaf, a pin carried by the second leaf and engageable with the said dog on the first leaf, a counter-weight pivotally mounted upon the second leaf, coupled to the eccentric cam and responsive to the rotation thereof, to govern the speed of said second leaf, a pawl rotatably supported by the shutter plate, said pawl being adapted to grasp the second leaf, means comprising the leaf pin and dog to link the leaves together after an exposure to maintain the leaves in aperture closing relationship with said opening being covered by the first leaf, means comprising the shaft and first leaf to raise the second leaf above its position of gravitational rest into an aperture closing relationship with respect to the opening in the shutter plate and into engagement with the said pawl, means consisting of an extended portion of the dog and the said cam to trip the dog and separate the leaves and means including an arm carried by the first leaf to trip the pawl as said first leaf is removed from its aperture closing position to release the second leaf to admit light into the camera and thereafter close the said shutter plate aperture.

STANLEY J. PASK.
GARNET P. GRANT, Jr.

REFERENCES CITED

The following references are of record in the file of this patent:

UNITED STATES PATENTS

| Number | Name | Date |
|---|---|---|
| 520,972 | Tisdell | June 5, 1894 |
| 590,752 | Cook | Sept. 28, 1897 |
| 1,393,983 | Swinscoe | Oct. 18, 1921 |
| 1,425,980 | Klein | Aug. 15, 1922 |
| 2,271,562 | Lotz | Feb. 3, 1942 |
| 2,410,237 | Renshaw | Oct. 29, 1946 |